(12) United States Patent
Yopp et al.

(10) Patent No.: US 9,475,464 B2
(45) Date of Patent: Oct. 25, 2016

(54) SENSOR SYSTEM AND METHOD FOR A VEHICLE

(75) Inventors: Wilford Trent Yopp, Canton, MI (US); Peter Gyumyeong Joh, Bloomfield Hills, MI (US); Wangdong Luo, Auburn Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1850 days.

(21) Appl. No.: 12/500,273

(22) Filed: Jul. 9, 2009

(65) Prior Publication Data

US 2011/0010045 A1    Jan. 13, 2011

(51) Int. Cl.
*B60S 1/08*    (2006.01)
*G06F 7/00*    (2006.01)

(52) U.S. Cl.
CPC ............ *B60S 1/0862* (2013.01); *B60S 1/0818* (2013.01)

(58) Field of Classification Search
CPC .......................... B60S 1/0862; B60S 1/0818
USPC .......................................................... 701/36
See application file for complete search history.

(56) References Cited

U.S. PATENT DOCUMENTS

| | | | |
|---|---|---|---|
| 4,931,767 A * | 6/1990 | Albrecht | B60Q 9/00 340/425.5 |
| 4,987,296 A * | 1/1991 | Kajioka | B60S 1/0822 250/222.1 |
| 5,117,168 A | 5/1992 | Nomura et al. | |
| 5,166,587 A * | 11/1992 | Smart | B60S 1/0896 318/444 |
| 5,216,341 A | 6/1993 | Nomura et al. | |
| 5,306,992 A * | 4/1994 | Droge | B60S 1/485 318/444 |
| 5,557,040 A | 9/1996 | Inenaga et al. | |
| 5,654,617 A * | 8/1997 | Mills | B60Q 1/143 318/443 |
| 5,949,150 A * | 9/1999 | MacDonald | B60S 1/0822 15/DIG. 15 |
| 6,239,570 B1 * | 5/2001 | Tanaka | B60S 1/0818 318/480 |
| 6,392,218 B1 * | 5/2002 | Kuehnle | B60S 1/0822 250/208.1 |
| 6,397,161 B1 * | 5/2002 | Tanaka | B60S 1/0818 250/573 |
| 6,774,988 B2 | 8/2004 | Stam et al. | |
| 7,042,387 B2 * | 5/2006 | Ridenour | G08G 5/0013 342/179 |
| 7,227,459 B2 | 6/2007 | Bos et al. | |
| 7,312,743 B2 * | 12/2007 | Ridenour | G08G 5/0013 342/179 |

(Continued)

FOREIGN PATENT DOCUMENTS

| | | | |
|---|---|---|---|
| JP | 59149847 A | 8/1984 |
| JP | 03136952 A | 6/1991 |

(Continued)

*Primary Examiner* — Thomas G Black
*Assistant Examiner* — Wae Louie
(74) *Attorney, Agent, or Firm* — Frank A. MacKenzie; Brooks Kushman P.C.

(57) ABSTRACT

A system and method is provided for determining if a windshield wiper of a vehicle should be automatically activated. The system and method may include a sensor system that receives at least one distance signal indicative of a distance between an object and a front windshield of the vehicle. The sensor system may further receive a relative velocity of the object using the at least one distance signal, the relative velocity being indicative of a velocity between the object and the front windshield of the vehicle. The sensor system may determine whether a windshield wiper should be automatically activated in response to the distance signal being within a distance activation range and the relative velocity being within a velocity activation range or the relative velocity exceeding a maximum velocity threshold.

17 Claims, 8 Drawing Sheets

(56) References Cited

U.S. PATENT DOCUMENTS

| | | | |
|---|---|---|---|
| 7,516,002 B2* | 4/2009 | Veerasamy | B32B 17/10036 318/483 |
| 7,567,199 B2* | 7/2009 | Ridenour | G08G 5/0013 342/179 |
| 7,612,356 B2* | 11/2009 | Utida | B60S 1/0822 250/227.25 |
| 7,752,907 B2* | 7/2010 | Veerasamy | B32B 17/10036 701/36 |
| 2002/0056805 A1* | 5/2002 | Bos | B60N 2/002 250/208.1 |
| 2007/0032952 A1* | 2/2007 | Carlstedt | B60R 21/0134 701/301 |
| 2007/0162201 A1* | 7/2007 | Veerasamy | B32B 17/10036 701/36 |
| 2007/0272884 A1* | 11/2007 | Utida | B60S 1/0822 250/573 |
| 2009/0312916 A1* | 12/2009 | Rao | B60R 21/0134 701/47 |
| 2011/0010045 A1* | 1/2011 | Yopp | B60S 1/0818 701/36 |

FOREIGN PATENT DOCUMENTS

| | | |
|---|---|---|
| JP | 04221253 A | 8/1992 |
| JP | 05065054 A | 3/1993 |
| JP | 05085311 A | 4/1993 |
| JP | 05254397 A | 10/1993 |
| JP | 06024295 A | 2/1994 |
| JP | 09066803 A | 3/1997 |
| JP | 10 138877 A | 5/1998 |
| JP | 11 263198 A | 9/1999 |
| JP | 2000025576 A | 1/2000 |
| WO | 9008680 A3 | 9/1990 |
| WO | 9614591 A1 | 5/1996 |

* cited by examiner

SENSOR SYSTEM AND METHOD FOR A VEHICLE

TECHNICAL FIELD

One or more embodiments of the present application relate to a sensor system and method that may be used to detect objects that may be approaching, or landing upon, a front windshield of a vehicle.

BACKGROUND

Conventional sensor systems may be included within a vehicle to detect rain or other liquids present on a front windshield of a vehicle. Such conventional sensor systems may be able to detect when the liquids are present on the windshield surface and may indicate that a windshield wiper should be activated. If activated, the windshield wiper may operate to clear the liquid from the front windshield thereby ensuring a driver's vision is not obstructed.

Such conventional sensor systems typically require one or more sensors configured to detect the moisture of the front windshield in order to determine if the liquid is present. Alternatively, the conventional sensory systems may include one or more sensors that generate a rain signal when a raindrop penetrates a path of an optical beam.

DETAILED DESCRIPTION OF ILLUSTRATIVE EMBODIMENTS

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
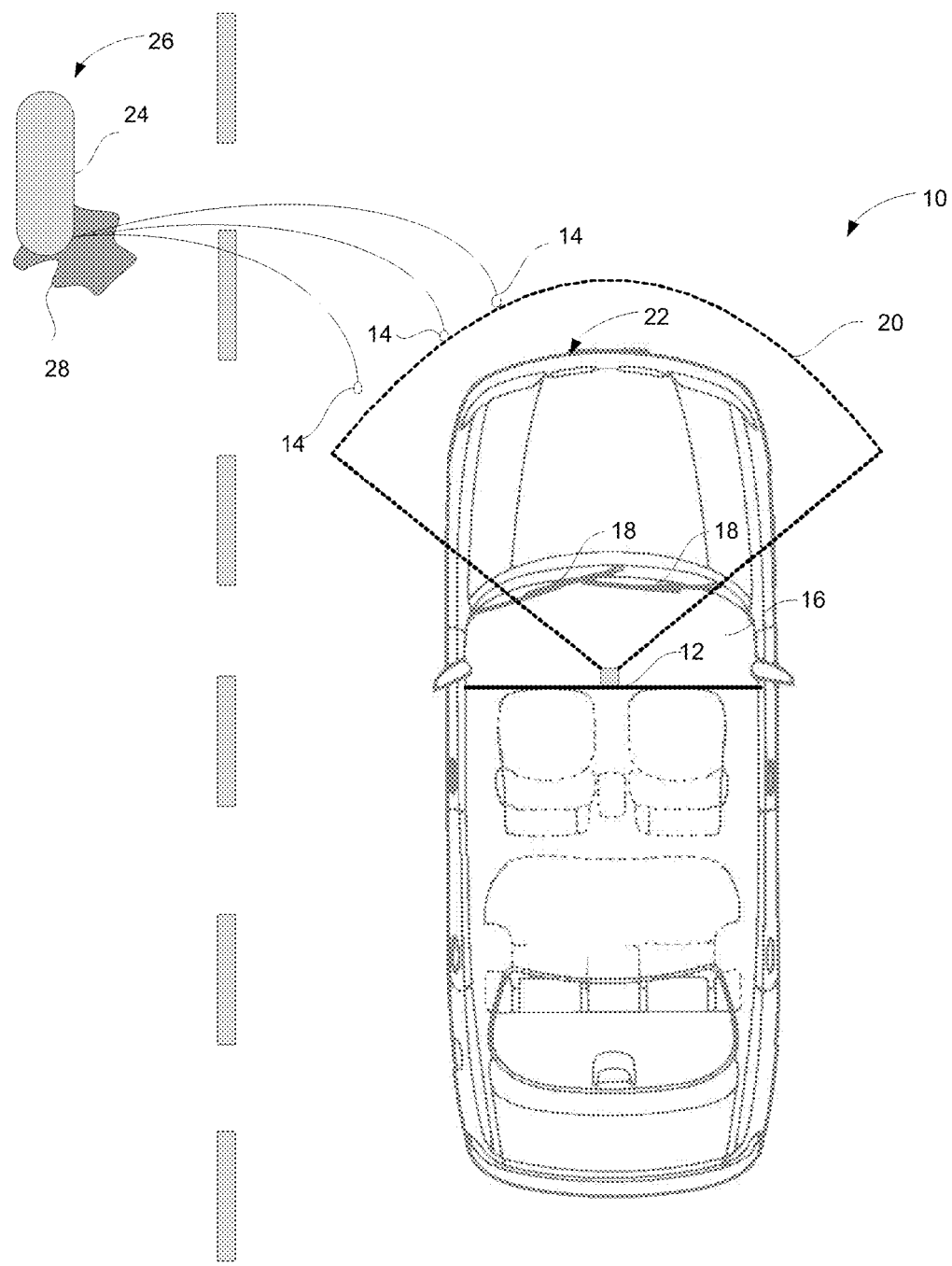
FIG. 1 is a top view of a vehicle that includes a sensor system according to one non-limiting embodiment of the present application.

FIG. 1 illustrates a vehicle 10 that includes a sensor system 12 including one or more sensors that may be used to detect the distance and/or the relative velocity of an object 14 that may be approaching, or landing upon, a front windshield 16 of the vehicle 10. In one non-limiting embodiment, the present application contemplates that the sensor system 12 may include one or more laser sensors that may be used to detect water, mud, snow, ice, or any other liquid-based object that may be approaching, or landing upon, the front windshield 16 of the vehicle 10. However, the present application further contemplates that the sensor system 12 may include one or more sonar sensors, cameras, and/or any other sensors suitable for detecting liquid based objects that may be approaching, or landing upon, the front windshield 16 of the vehicle 10.

Furthermore, the present application contemplates that the sensor system 12 may use the one or more sensors to detect the distance of the object 14 from the sensor system 12. The sensor system 12 may then use the detected distance in order to determine a relative velocity of the object 14 that may be approaching, or landing upon, the front windshield 16 of the vehicle 10. For example, in one non-limiting embodiment the present application contemplates that the sensor system 12 may be a closing velocity (CV) sensor system that may include one or more laser sensors. The CV sensor system may be configured so as to be capable of detecting the distance and/or relative velocity of the object 14 approaching, and/or landing upon, the front windshield 16 of the vehicle 10.

The sensor system 12 may also include a controller (not shown) that may be used to determine whether to indicate that one or more windshield wipers 18 should be activated. If activated, the one or more windshield wipers 18 may operate to remove the objects 14 from the front windshield 16 thereby ensuring that a driver's vision may not be obscured.

The present application further contemplates that the sensor system 12 may be positioned behind the front windshield 16 of the vehicle 10. As such, the sensor system 12 may be protected from ambient conditions that may include rain, snow, sleet, wind, or the like. Furthermore, by positioning the sensor system 12 behind the front windshield 16, the sensor system 12 may be capable of having a detection area 20 that projects from the front windshield 16 outward past a front end 22 of the vehicle 10. Lastly, by positioning the sensor system 12 behind the front windshield 16, the sensor system 12 may be capable of detecting objects 14 that may be approaching, or landing upon, the front windshield 16 of the vehicle 10.

For example, a tire 24 of a second vehicle 26 may ride through a puddle 28 and may project one or more objects 14 toward the vehicle 10. Furthermore, the present application contemplates that the one or more objects 14 projected from the puddle 28 may include water, dirt, mud, snow, or the like. When at least one of the objects 14 enters the detection area 20, the sensor system 12 may be capable of detecting the distance and/or relative velocity of the objects 14. The sensor system 12 may then determine whether the distance or and/or relative velocity indicate if at least one of the objects 12 are approaching the front windshield 16 of the vehicle 10. If the sensor system 12 determines that at least one of the objects 14 is approaching the front windshield 16 of the vehicle 10, the sensor system 12 may indicate that the front windshields 18 should be activated. If activated, the objects 14 may be removed from the front windshield 16 thereby ensuring the driver's vision is not obscured.

However, the present application also contemplates that the one or more objects 14 may be projected toward the front windshield 16 when the vehicle 10 drives through a puddle (not shown). Upon driving through the puddle, the vehicle 10 may project the objects 14 toward the front windshield 16. Again, when at least one object enters the detection area 20, the sensor system 12 may detect the distance and/or relative velocity of the object. The sensor system 12 may use the distance and/or relative velocity in order to determine if the one or more objects are approaching the front windshield 16. If the sensor system 12 determines that the objects are approaching the front windshield 16 of the vehicle 10, the sensor system 12 may indicate that the front windshields 18 should be activated. If activated, the objects 14 may be removed from the front windshield 16 thereby ensuring the driver's vision is not obscured.

The present application further contemplates that the sensor system 12 may be capable of detecting objects 14 that may land upon the front windshield 16 from above the vehicle 10. For example, the sensor system 12 may detect the distance and/or relative velocity of objects such as mud, snow, water, or the like that may be projected onto the front windshield 16 as the vehicle 10 passes beneath an overpass of a roadway. Alternatively, the sensor system 12 may detect the distance and/or relative velocity of objects such as rain, snow, sleet, or the like that may be land upon the front windshield 16 during a rain, snow, or sleet storm. Once detected, the sensor system 12 may again determine whether the distance and/or relative velocity of the objects indicate that the windshield wipers 18 should be activated. If activated, the objects may be removed from the front windshield 16 thereby ensuring the driver's vision is not obscured.

Figure 2:
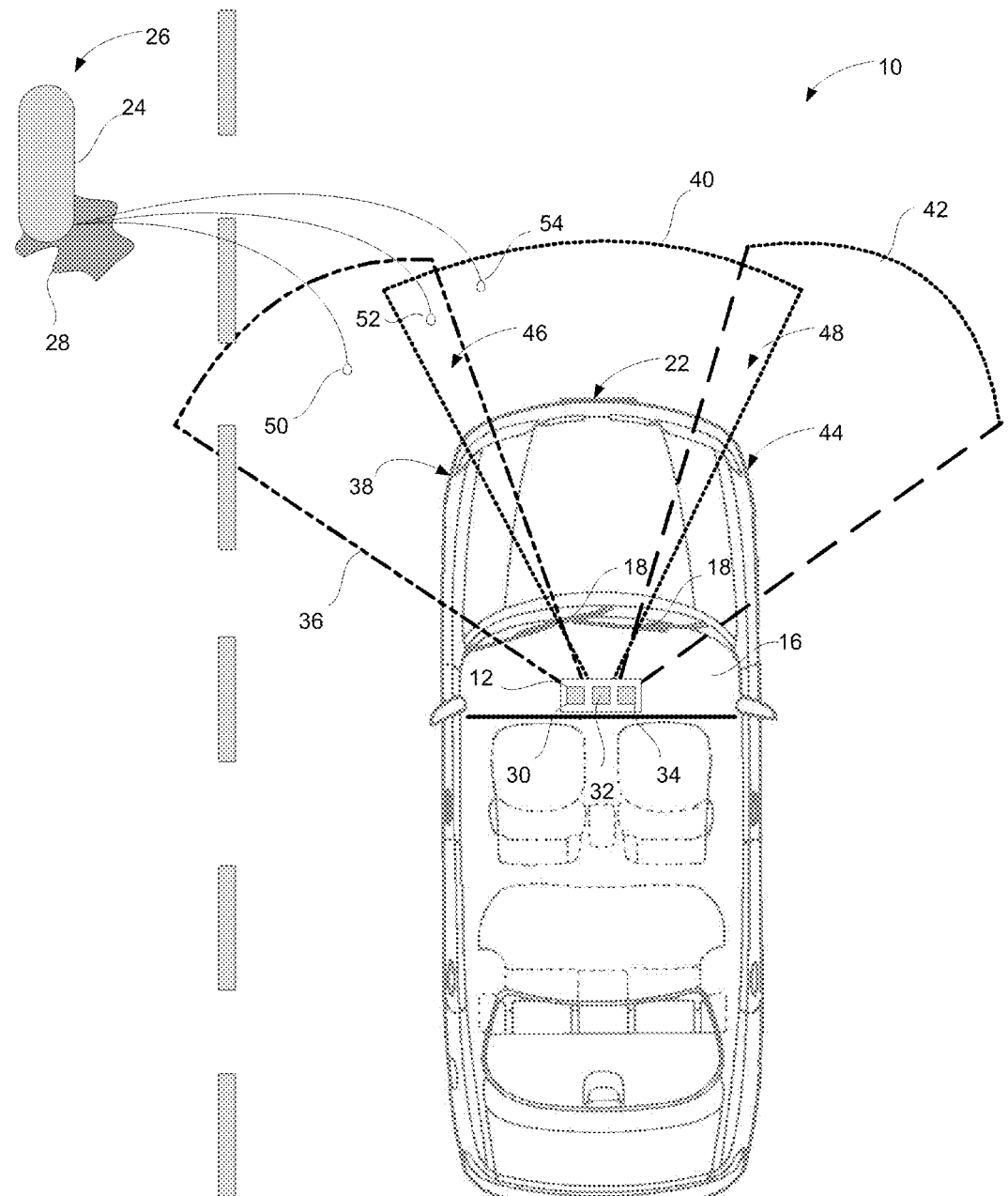
FIG. 2 is another top view of the vehicle that includes the sensor system according to another non-limiting embodiment of the present application.

With reference back to the drawings, FIG. 2 illustrates the sensor system 12 including a plurality of sensors. More particularly, FIG. 2 illustrates that the sensor system 12 may include a left, center, and right sensor 30, 32, 34. The left sensor 30 may include a left detection area 36 which may be used by the sensor system 12 to detect the distance and/or relative velocity of objects approaching the front windshield 16 from a left side 38 of the vehicle 10. The center sensor 32 may include a center detection area 40 which may be used by the sensor system 12 to detect the distance and/or relative velocity of objects approaching the front windshield 16 from a front end 22 of the vehicle 10. Lastly, the right sensor 34 may include a right detection area 42 which may be used by the sensor system 12 to detect the distance and/or relative velocity of objects approaching the front windshield 16 from a right side 44 of the vehicle 10.

In one non-limiting example, the present application contemplates that the sensor system 12 may include a left, center, and right laser sensor. The left laser sensor may be used by the sensor system 12 to detect the distance and/or relative velocity of objects approaching the front windshield 16 from a left side 38 of the vehicle 10. The center laser sensor may be used by the sensor system 12 to detect the distance and/or relative velocity of objects approaching the front windshield 16 from a front end 22 of the vehicle 10. Lastly, the right laser sensor may be used by the sensor system 12 to detect the distance and/or relative velocity of objects approaching the front windshield 16 from a right side 44 of the vehicle 10.

As is further illustrated in FIG. 2, the tire 24 of an approaching vehicle 26 may drive through the puddle 28 so as to project one or more objects 50, 52, 54 toward the vehicle 10. The one or more objects 50, 52, 54 may enter into one or more of the left, center, and/or right detection areas 36, 40, 42. For example, FIG. 2 illustrates that a first object 50 may enter the left detection area 36 of the left sensor 30. In addition, FIG. 2 illustrates a second object 54 may enter the center detection area 40 of the center sensor 32. In turn, the sensor system 12 may be able to determine the distance and/or relative velocity of the objects 50, 54 using the left and center sensors 30, 32. Using the distance and/or relative velocity, the sensor system 12 may be capable of determining whether the objects 50, 54 are approaching the front windshield 16. If the sensor system 12 determines that the objects 50, 54 are approaching the front windshield 16, the sensor system 12 may indicate that the windshield wipers 18 should be activated. If activated, the windshield wipers 18 may remove the objects 50, 54 from the front windshield 18 thereby ensuring that the driver's vision is not obscured.

However, one or more embodiments of the present application further contemplates that by incorporating more than one sensor, the sensor system 12 may include overlap areas of the right, center, and/or left detection areas 36, 40, 42. For example, FIG. 2 illustrates that the left detection zone 36 and the center detection zone 40 may include an overlap zone 46. Furthermore, the center detection zone 40 and the right detection zone 42 may include an overlap zone 48. The overlap zones 46, 48 may allow the sensor system 12 the capability of detecting objects using more than one of the left, center, and/or right sensors 30, 32, 34. For example, an object 52 may enter the overlap area 46. As such, the distance and/or relative velocity of the object 52 may be determined using both the left and center detection zones 36, 40 of the left and right sensors 30, 32. Using the distance and/or relative velocity from both the left and center sensors 30, 32, the sensor system 12 may be able to determine and confirm that the object 52 is approaching the front windshield 16 of the vehicle 10.

The present application further contemplates that the sensor system 12 illustrated in FIG. 2 may also be capable of detecting objects that may fall upon the front windshield 16 from above the vehicle 10. Similar to FIG. 1, the sensor system 12 may detect the distance and/or relative velocity of objects such as mud, snow, water, or the like that may be projected onto the front windshield 16 when the vehicle 10 passes beneath an overpass of a roadway. Also, the sensor system 12 may detect the distance and/or relative velocity of objects such as rain, snow, sleet, or the like that may be projected onto the front windshield 16 during a rain, snow, or sleet storm. Using the distance and/or relative velocity, the sensor system 12 may be capable of determining whether the objects have landed upon the front windshield 16. If the sensor system 12 determines that the objects have landed upon the front windshield 16, the sensor system 12 may indicate that the windshield wipers 18 should be activated. If activated, the windshield wipers 18 may remove the objects 50, 54 from the front windshield 18 thereby ensuring that the driver's vision is not obscured.

Figure 3:
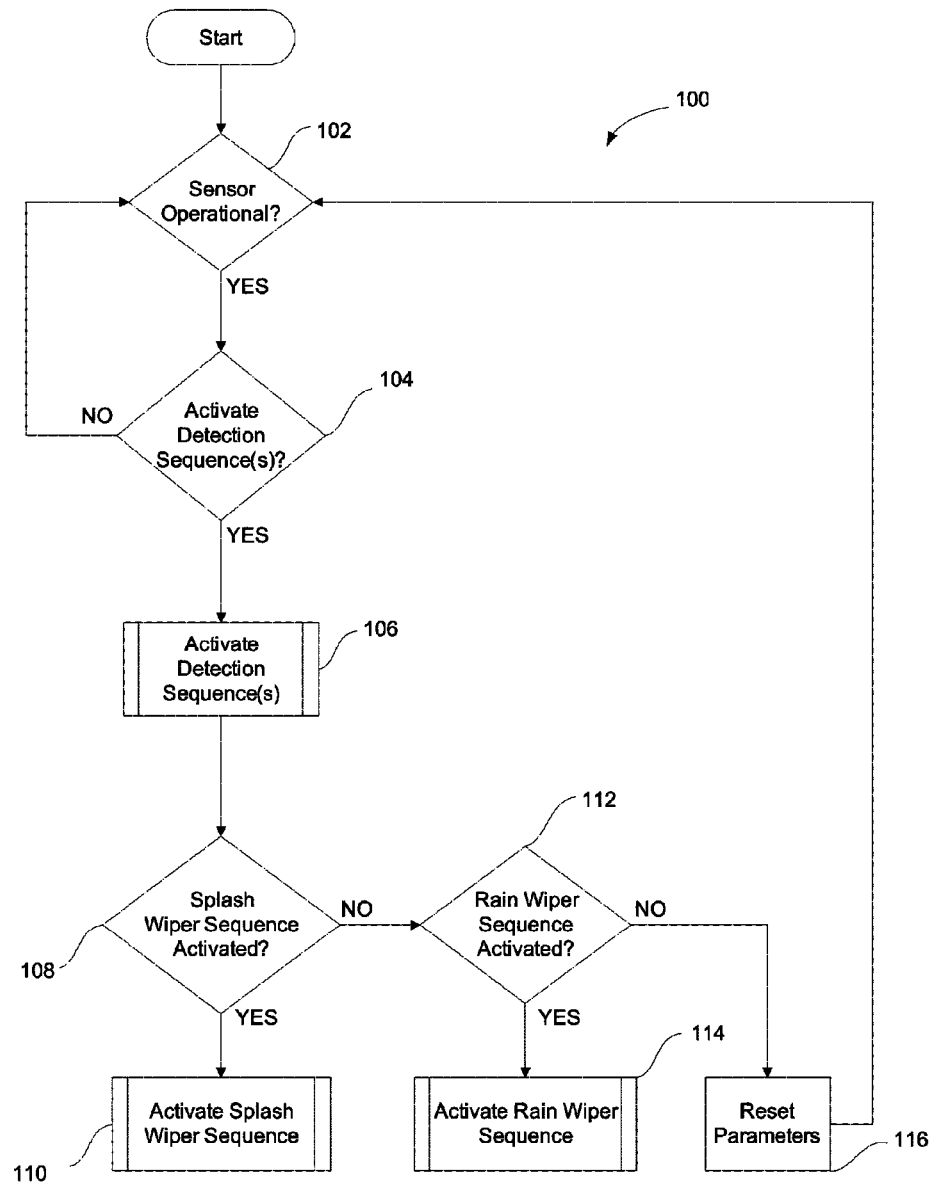
FIG. 3 is an exemplary flow diagram for detecting objects approaching a front windshield according to one non-limiting embodiment of the present application.

FIG. 3 illustrates an exemplary, flow diagram 100 according to one or more embodiments of the present application. However, it should be noted that the flow diagram 100 illustrated in FIG. 3 is merely exemplary and the operation, function, or steps of the flow diagram 100 may be performed in a fashion other than the order described herein.

The flow diagram 100 may begin at operation 102 where the sensor system 12 is initialized. One or more embodiments of the present application contemplate that during initialization, the sensor system 12 may determine if the one or more sensors are operating correctly. For example, with reference to FIG. 2, the sensor system 12 may determine the operation of the left, center and the right sensors 30, 32, 34. If the sensor system 12 determines that the one or more sensors are operating correctly, the flow diagram 100 proceeds to operation 104. However, if the sensor system 12 determines that the one or more sensors are not operating correctly, the flow diagram 100 proceeds back to operation 102.

In operation 104, the sensor system 12 may determine if the detection sequence should be activated. For example, if the sensor system 12 determines that the vehicle is operating below a minimum threshold speed (e.g., less than 5 miles per hour), then the sensor system 12 may not activate the detection sequence. Alternatively, the sensor system 12 may not activate the detection sequence because the transmission of the vehicle 10 is positioned in neutral or park. Moreover, the present application contemplates that the sensor system 12 may include one or more detection sequences.

For example, the sensor system 12 may include a splash detection sequence which may operate to detect the distance and/or relative velocity of objects (e.g., water, mud, dirt, snow, or ice) in order to determine whether the distance and/or relative velocity indicate that the objects may be approaching the front windshield 16 of the vehicle 10. More particularly, the present application contemplates that the splash detection sequence may be used by the sensor system 12 in order to determine if the distance of at least one object may be within a distance activation range. The distance activation range being indicative of a predetermined distance from the front windshield 16 outward toward the front end 22 of the vehicle 10. In addition, the present application further contemplates that the splash detection sequence may be used by the sensor system 12 in order to determine if the relative velocity of at least one object may be within than a predetermined velocity range.

Furthermore, the sensor system 12 may include a rain detection sequence which may operate to detect the distance and/or relative velocity of objects (e.g., rain, snow, water, mud, sleet, or ice) in order to determine whether at least one object may have landed upon the front windshield 16. The present application contemplates that the sensor system 12 may use the rain detection sequence in order to determine whether the relative velocity of the object upon the front windshield 16 exceeds a maximum velocity threshold. The maximum velocity threshold may be representative of the object landing, running upon, the front windshield 16. For example, with reference to FIG. 2, rain landing upon the front windshield 16 may result in the left, center, or right sensors 30, 32, 34 detecting extremely high velocity signals. The sensor system 12 may compare the velocity signal against the maximum velocity threshold and determine that rain has landed upon the front windshield 16. In turn, the sensor system 12 may indicate that the windshield wipers 18 should be activated.

Once the sensor system 12 determines if the detection sequence should be activated, the flow diagram 100 proceeds to operation 106. However, if the sensor system 12 determines that the detection sequence should not be activated, the flow diagram proceeds back to operation 102.

In operation 106, the sensor system 12 may activate the one or more detection sequences. For example, the sensor system 12 may activate one or both of the splash detection sequence and the rain detection sequence. Once activated, the sensor system 12 may activate the one or more sensors in order to determine if an object may be approaching, or falling upon, the front windshield 16 of the vehicle 10.

For example, with reference to FIG. 2, the sensor system 12 may activate the left, center, and right sensors 30, 32, 34. Once activated the left, center, and right sensors 30, 32, 34 may operate to detect the distance and/or relative velocity of objects that enter the left, center, or right detection areas 36, 40, 42. Alternatively, the left, center, and right sensors 30, 32, 34 may operate to detect the distance and/or relative velocity of objects that fall upon the front windshield 16 of the vehicle 10. Using the distance and/or relative velocity, the sensor system 12 may be capable of determining whether the objects may be approaching, or falling upon, the front windshield 16. If the sensor system 12 determines that the objects are approaching, or have falling upon, the front windshield 16 the sensor system 12 may indicate that the windshield wipers 18 should be activated. Once the sensor system 12 completes the detection sequence, the flow diagram 100 proceeds to operation 108.

In operation 108, the sensor system 12 determines whether to indicate that the front windshield wipers 18 should be activated as a result of an object approaching the front windshield 16 (e.g., splash detection). More particularly, the present application contemplates that the windshield wipers 18 may be activated if the sensor system 12 determines during the splash detection sequence that one or more objects are approaching the front windshield 16. If yes, the flow diagram 100 proceeds to operation 110. However, if the sensor system 12 has not indicated that the front windshield wipers 18 should be activated, the flow diagram 100 proceeds to operation 112.

In operation 110, a splash wiper sequence may be activated that may be indicative of the sensor system 12 determining that an object may be approaching the front windshield 16 of the vehicle 10. The splash wiper sequence may activate the windshield wipers 18 according to a predetermined sequence. For example, the splash wiper sequence may activate the windshield wipers 18 at a high intensity setting for a predetermined period of time. The splash wiper sequence may then adjust the intensity setting of the windshield wipers 18 after a predetermined period of time. Alternatively, the splash wiper sequence may adjust the intensity setting of the windshield wipers 18 if the sensor system 12 no longer indicates that the windshield wipers 18 should be activated.

In operation 112, the sensor system 12 determines whether to indicate that the front windshield wipers 18 should be activated as a result of an object falling upon the front windshield 16 (e.g., rain detection). More particularly, the present application contemplates that the windshield wipers 18 may be activated if the sensor system 12 determines during the rain detection sequence that one or more objects are falling upon the front windshield 16. If yes, the flow diagram 100 proceeds to operation 114. However, if the sensor system 12 has not indicated that the front windshield wipers 18 should be activated, the flow diagram 100 proceeds to operation 116.

In operation 114, a rain mode wiper sequence may be activated that may be indicative of the sensor system 12 determining that an object may have fallen upon the front windshield 16 of the vehicle 10. The rain mode wiper sequence may activate the windshield wipers 18 according to a predetermined sequence. For example, the rain mode wiper sequence may activate the windshield wipers 18 at a high intensity setting for a predetermined period of time.

The rain mode wiper sequence may then adjust the intensity setting of the windshield wipers 18 after a predetermined period of time. Alternatively, the rain mode wiper sequence may adjust the intensity setting of the windshield wipers 18 if the sensor system 12 no longer indicates that the windshield wipers 18 should be activated.

Figure 4:
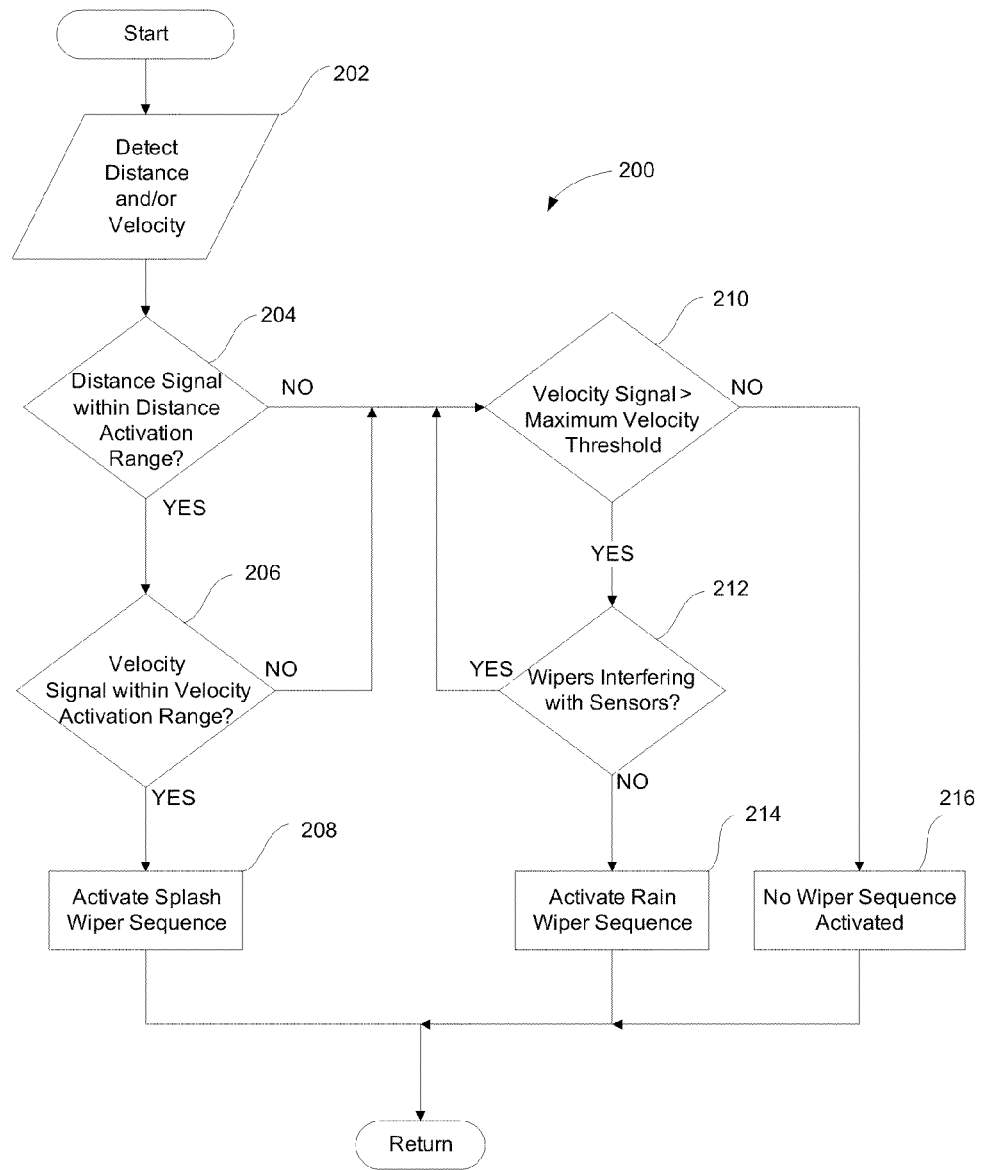
FIG. 4 is another exemplary flow diagram for detecting objects approaching a front windshield according to another non-limiting embodiment of the present application.

With reference to FIG. 4, an exemplary, flow diagram 200 is illustrated according to one or more embodiments of the present application. However, it should be noted that the flow diagram 200 illustrated in FIG. 4 is merely exemplary, and the operation, function, or steps of the flow diagram may performed in any fashion other than the order described herein. The flow diagram 200 illustrated may be used by the sensor system 12 in order to detect objects approaching the front windshield 16 of the vehicle 10. More particularly, the present application contemplates that the flow diagram 200 may be used to activate the one or more detection sequences as described above with respect to flow diagram 100.

Flow diagram 200 may begin at operation 202 where the sensor system 12 detects the distance and/or relative velocity data of at least one object approaching, or falling upon, the front windshield 16 of the vehicle 10. The sensor system 12 may acquire the distance and/or relative velocity data using the one or more sensors. For example, with reference to FIG. 2, the sensor system 12 may detect the distance and/or relative velocity using the left, center, and right sensors 30, 32, 34. Moreover, the present application contemplates that the sensor system 12 may detect the distance and/or relative velocity of the one or more objects using one or more laser sensors, sonar sensors, or any other sensor capable of detecting a distance and/or relative velocity of an object. Once the sensor system 12 acquires the distance and/or relative velocity, the flow diagram 200 proceeds to operation 204.

Figure 5:
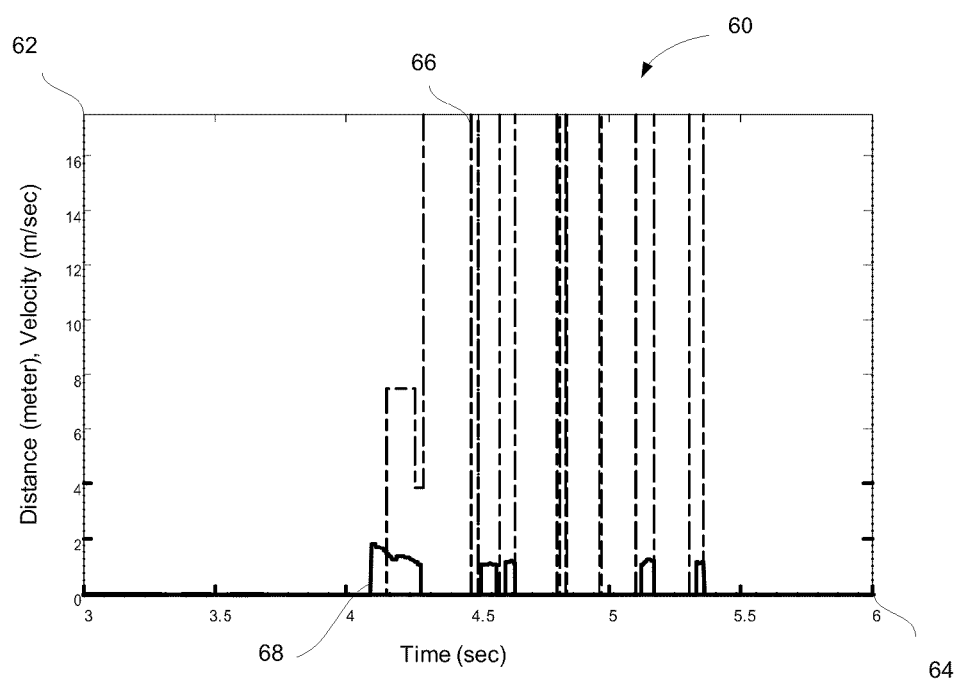
FIG. 5 is an exemplary graph illustrating distance and velocity signals according to a non-limiting embodiment of the present application.

Furthermore with reference to FIG. 5, an exemplary graph 60 is illustrated of the distance and velocity signals that may be detected during operation 202. As illustrated, the graph 60 includes a vertical axis 62 that is representative of the distance and velocity signals detected in operation 202. The graph 60 further includes a horizontal axis 64 that is representative of the time between the distance and velocity signals detected in operation 202.

As is further illustrated, a detected distance 66 may be acquired by the sensor system 12 using at least one of the included sensors. Furthermore, a detected velocity 66 may be acquired by the sensor system 12 using at least one of the included sensors.

In operation 204, the sensor system 12 may determine if the distance signal received is within a distance activation range. For example, with reference to FIG. 1, when one or more of the objects 14 enter the detection area 20, the sensor system 12 may determine the distance of the objects 14 from the front end 22 (e.g., bumper) relative to the front windshield 16. If the sensor system 12 determines that at least one of the objects 14 are within the distance activation range, the flow diagram 200 proceeds to operation 206. However, if the sensor system 12 determines that no objects 14 are within the distance activation range, the flow diagram 200 proceeds to operation 210.

In operation 206, the sensor system 12 may determine whether at least one of the objects 14 is within a velocity activation range. For example, with reference back to FIG. 1, if at least one object 14 enters the detection area 20, the sensor system 12 may determine whether the relative velocity of the object 14 approaching the front windshield 16 is within the velocity activation range. If the sensor system 12 determines that the relative velocity of the at least one object is within the velocity activation range, the flow diagram 200 proceeds to operation 208. However, if the sensor system 12 determines that the at least one object is not within the velocity activation range, the flow diagram 200 proceeds to operation 210.

In operation 208, the sensor system 12 may determines whether to indicate that the front windshield wipers 18 should be activated due to one or more objects approaching the front windshield 16. More particularly, one or more embodiments of the present application contemplate that the sensor system 12 may indicate that the splash wiper sequence should be activated as described above in flow diagram 100. The sensor system 12 may indicate that the splash wiper sequence should be activated upon determining that at least one object may be approaching the front windshield 16.

With reference back to operations 204 and 206, if the sensor system 12 determines that either the distance and/or relative velocity of the object is not within a distance or velocity activation range, the flow diagram 200 proceeds to operation 210. In operation 210, the sensor system 12 determines if the relative velocity of at least one object exceeds a maximum velocity threshold. For example, with reference back to FIG. 1, if the sensor system 12 determines that at least one of the objects 14 exceeds a maximum velocity threshold, the sensor system may indicate that the windshield wipers 18 should be activated. One or more embodiments of the present application contemplate that by exceeding a maximum velocity threshold, the object may be laying upon the front windshield 16. The present application further contemplates that the object may have fallen onto the front windshield 16 during a rain, sleet, or snow storm. As such, if the relative velocity of the object exceeds a maximum velocity threshold, the flow diagram proceeds to operation 212. However, if the relative velocity of the object does not exceed a maximum velocity threshold, the flow diagram 200 proceeds to operation 216.

In operation 212, the sensor system 12 checks to determine whether the windshield wipers 18 are interfering with the sensor system 12. For example, if the windshield wipers 18 cross into the path of one or more of the sensors the sensor system may erroneously determine that the relative velocity of the object has exceeded the maximum velocity threshold. Thus, the sensor system 12 checks to ensure that relative velocity data acquired in operation 202 of at least one object has exceeded the maximum velocity threshold. If the sensor system 12 determines that the windshield wiper 18 may be interfering with one or more of the sensors, the flow diagram 200 proceeds back to operation 210. However, if the sensor system 12 determines that the windshield wiper 18 are not interfering with one or more of the sensors, the flow diagram 200 proceeds to operation 214.

In operation 214, the sensor system 12 may determines whether to indicate that the front windshield wipers 18 should be activated due to one or more objects exceeding the maximum velocity threshold. More particularly, one or more embodiments of the present application contemplate that operation 214 illustrates that the sensor system 12 may indicate that the rain wiper sequence should be activated as described above in flow diagram 100. The sensor system 12 may indicate that the rain wiper sequence should be activated upon determining that at least one object may have fallen onto the front windshield 16.

In operation 216, the sensor system 12 may determine that no wiper sequence should be activated. The sensor system 12 may determine no wiper sequence should be activated if the distance and/or relative velocity indicate that no objects appear to be approaching, or landing upon, the front windshield 16.

Figure 6:
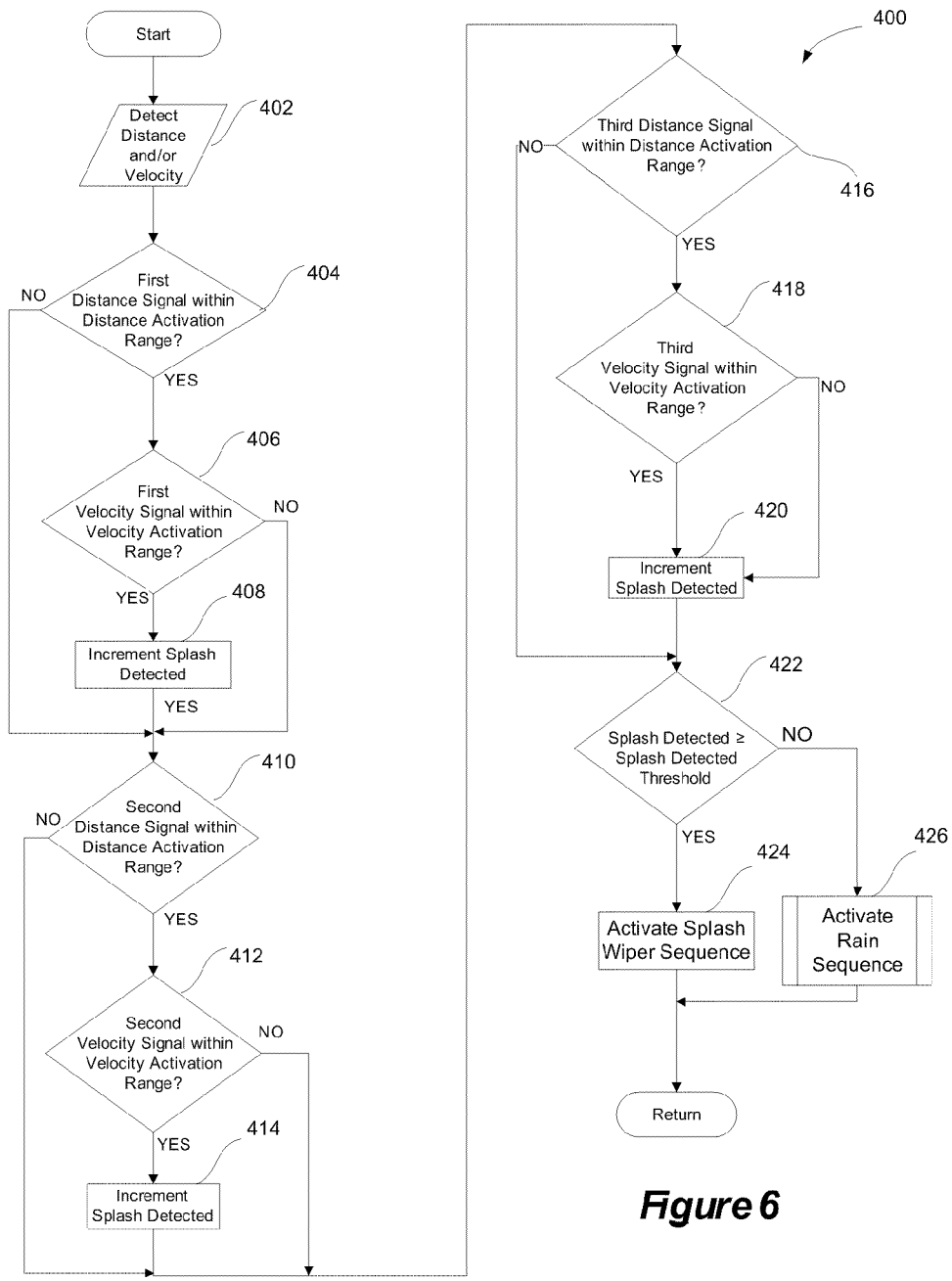
FIG. 6 is another exemplary flow diagram for detecting objects approaching a front windshield according to another non-limiting embodiment of the present application.

With reference back to the drawings, FIG. 6 is an exemplary, flow diagram 400 according to one or more embodiments of the present application. However, it should be noted that flow diagram 400 as illustrated in FIG. 6 is merely exemplary and the operation, function, or steps of the flow diagram 400 may be performed in a fashion other than the order described herein. The present application contemplates that flow diagram 400 may be used when the sensor system 12 includes a plurality of sensors. For example, with reference to FIG. 2, flow diagram 400 may be incorporated when the sensor system 12 includes a left, center, and right sensor 30, 32, 34.

Flow diagram 400 may begin at operation 402 where the sensor system 12 detect distance and/or relative velocity data of at least one object using a number of the included sensors. For example, with reference to FIG. 2, the sensor system 12 may acquire the distance and/or relative velocity data of an object using the left, center, and right sensors 30, 32, 34. Once the sensor system 12 detects the distance and/or relative velocity, the flow diagram 400 proceeds to operation 404.

In operation 404, the sensor system 12 may determine if the distance and/or relative velocity of at least a first object is within a first distance activation range. For example, with reference to FIG. 2, the sensor system 12 may determine if the distance of the object 50 detected by the left sensor 30 is within the first distance activation range. If the sensor system 12 determines that the distance of the at least first object is within the first distance activation range, the flow diagram 400 proceeds to operation 406. However, if the sensor system 12 determines that the distance of the at least first object is not within the first distance activation range, the flow diagram 400 proceeds to operation 410.

In operation 406, the sensor system 12 may determine if the relative velocity of the at least first object is within a predetermined velocity activation range. For example, with reference back to FIG. 2, the sensor system 12 may determine if the relative velocity of the object 50 detected by the left sensor 30 is within the predetermined velocity activation range. If the sensor system 12 determines that the relative velocity of the at least first object is within the predetermined activation range, the flow diagram 400 proceeds to operation 408. However, if the sensor system 12 determines that the relative velocity of the at least first object is not within the velocity activation range, the flow diagram 400 proceeds to operation 410.

In operation 408, the sensor system 12 may increment a splash detected value. The splash detected value may be incremented because the sensor system 12 determined that at least one object exceeded both the first distance and velocity activation range. Once the sensor system 12 increments the splash detected value, the flow diagram 400 proceeds to operation 410.

In operation 410, the sensor system 12 may determine if the distance and/or relative velocity of at least a second object is within a second distance activation range. If the sensor system 12 determines that the distance of the at least second object is within the second distance activation range, the flow diagram 400 proceeds to operation 412. However, if the sensor system 12 determines that the distance of the at least second object is not within the second distance activation range, the flow diagram 400 proceeds to operation 416.

In operation 412, the sensor system 12 may determine if the relative velocity of the at least second object is within a second velocity activation range. If the sensor system 12 determines that the relative velocity of the at least second object is within the second activation velocity range, the flow diagram 400 proceeds to operation 414. However, if the sensor system 12 determines that the relative velocity of the at least second object is not within the second velocity activation range, the flow diagram 400 proceeds to operation 416.

In operation 414, the sensor system 12 may again increment the splash detected value. The splash detected value may again be incremented because the sensor system 12 determined that the at least second object exceeded both the second distance and velocity activation range. Once the sensor system 12 increments the splash detected value, the flow diagram 400 proceeds to operation 416.

In operation 416, the sensor system 12 may determine if the distance and/or relative velocity of at least a third object is within a third distance activation range. If the sensor system 12 determines that the distance of the at least third object is within the third distance activation range, the flow diagram 400 proceeds to operation 418. However, if the sensor system 12 determines that the distance of the at least third object is not within the third distance activation range, the flow diagram 400 proceeds to operation 422.

In operation 418, the sensor system 12 may determine if the relative velocity of the at least third object is within a third velocity activation range. If the sensor system 12 determines that the relative velocity of the at least third object is within the third velocity activation range, the flow diagram 400 proceeds to operation 420. However, if the sensor system 12 determines that the relative velocity of the at least third object is not within the third velocity activation range, the flow diagram 400 proceeds to operation 422.

In operation 420, the sensor system 12 may again increment the splash detected value. The splash detected value may again be incremented because the sensor system 12 determined that the at least third object exceeded both the third distance and velocity activation range. Once the sensor system 12 increments the splash detected value, the flow diagram 400 proceeds to operation 422.

In operation 422, the sensor system 12 may determine if the incremented splash detected value exceeds a splash detected threshold. If yes, the sensor system 12 may proceed to operation 424. However, if the splash detected value does not exceed a splash detected threshold, the flow diagram proceeds to operation 426. The present application contemplates that operation 426 may activate the rain detection sequence. The present application contemplates that the rain detection sequence activated by the sensor system 12 in operation 426 may be the rain detection sequence described below with reference to FIG. 7.

In operation 424, the sensor system 12 may indicate that the windshield wipers 18 should be activated. More particularly, one or more embodiments of the present application contemplate that the sensor system 12 may indicate that the splash wiper sequence, as described above with reference to FIG. 3, should be activated. The present application contemplates that the splash wiper sequence may be activated because the sensor system 12 has determined that the one or more objects are approaching the front windshield 16 of the vehicle 10.

Figure 7:
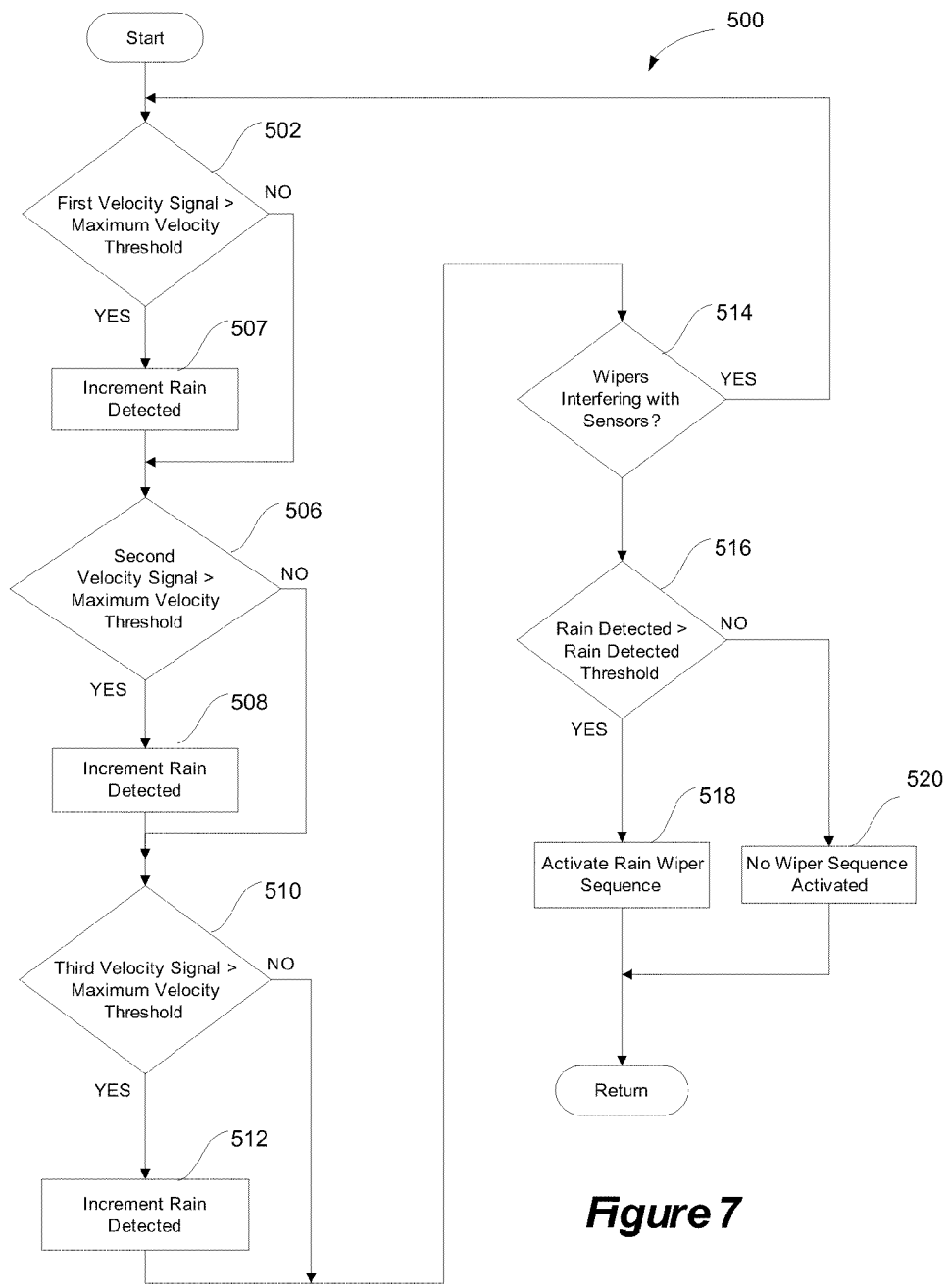
FIG. 7 is another exemplary flow diagram for detecting objects approaching a front windshield according to another non-limiting embodiment of the present application.

With reference to FIG. 7, another exemplary, flow diagram 500 is illustrated according to one or more embodiments of the present application. However, it should be noted that the flow diagram 500 illustrated in FIG. 7 is merely exemplary and the operation, function, or steps of the flow diagram 500 may be performed in a fashion other than the order described herein. The present application contemplates that flow diagram 400 may be used when the sensor system 12 includes a plurality of sensors. For example, with reference to FIG. 2, flow diagram 500 may be incorporated when the sensor system 12 includes a left, center, and right sensor 30, 32, 34.

The present application further contemplates that flow diagram 700 may be used by the sensor system 12 in order to determine if one or more objects have fallen upon the front windshield 16. For example, the present application contemplates that flow diagram 700 may be performed by the sensor system 12 in order to determine if an object has fallen onto the front windshield during a rain, sleet, or snow storm.

Flow diagram 500 may began at operation 502 where the sensor system 12 may determine if the relative velocity of at least the first object exceeds a first maximum velocity threshold. For example, with reference back to FIG. 2, the sensor system 12 may determine if the relative velocity of the object 54 detected by the center sensor 28 exceeds the first maximum velocity threshold. If the sensor system 12 determines that the relative velocity of the at least first object exceeds the first maximum velocity threshold, the flow diagram proceeds to operation 504. However, if the sensor system 12 determines that the relative velocity of the at least first object does not exceed the first maximum velocity threshold, the flow diagram 500 proceeds to operation 506.

In operation 504, the sensor system 12 may increment the rain detected value. The rain detected value may be incremented because the sensor system 12 determined that the at least first object exceeded the first maximum velocity threshold. Once the sensor system 12 increments the rain detected value, the flow diagram 500 proceeds to operation 506.

In operation 506, the sensor system 12 may determine if the relative velocity of at least a second object exceeds a second maximum velocity threshold. If the sensor system 12 determines that the relative velocity of the at least second object exceeds the second maximum velocity threshold, the flow diagram proceeds to operation 508. However, if the sensor system 12 determines that the relative velocity of the at least second object does not exceed the second maximum velocity threshold, the flow diagram 500 proceeds to operation 510.

In operation 508, the sensor system 12 may again increment the rain detected value. The rain detected value may again be incremented because the sensor system 12 determined that the at least second object exceeded the second maximum velocity threshold. Once the sensor system 12 again increments the rain detected value, the flow diagram 500 proceeds to operation 510.

In operation 510, the sensor system 12 may determine if the relative velocity of at least a third object exceeds a third maximum velocity threshold. If the sensor system 12 determines that the relative velocity of the at least third object exceeds the third maximum velocity threshold, the flow diagram proceeds to operation 512. However, if the sensor system 12 determines that the relative velocity of the at least third object does not exceed the third maximum velocity threshold, the flow diagram 500 proceeds to operation 514.

In operation 512, the sensor system 12 may again increment the rain detected value. The rain detected value may again be incremented because the sensor system 12 determined that the at least third object exceeded the third maximum velocity threshold. Once the sensor system 12 again increments the rain detected value, the flow diagram 500 proceeds to operation 514.

In operation 514 the sensor system 12 may determine if the windshield wipers 18 are interfering with one or more sensors. For example, with reference to FIG. 2, the sensor system 12 may determine if the relative velocity detected using the left, center, and right sensors 30, 32, 34 have erroneously exceeded the first, second, or third maximum velocity threshold. If the sensor system 12 determines that the windshield wiper 18 may be interfering with one or more of the sensors, the flow diagram 500 proceeds back to operation 502. However, if the sensor system 12 determines that the windshield wipers 18 are not interfering with one or more of the sensors, the flow diagram 500 proceeds to operation 516.

In operation 516, the sensor system 12 may determine if the rain detected value exceeds a rain detected threshold. If the sensor system 12 determines that the rain detected value exceeds the rain detected threshold, the flow diagram 500 proceeds to operation 518. However, if the sensor system 12 determines that the rain detected value does not exceed the rain detected threshold, the sensor system 12 proceeds to operation 520.

In operation 518, the sensor system 12 indicates that the windshield wipers 18 should be activated. More particularly, one or more embodiments of the present application contemplate that the sensor system 12 may indicate that the rain wiper sequence, as described above with reference to FIG. 3, should be activated. The present application contemplates that the rain wiper sequence should be activated because the sensor system has determined that the one or more objects have fallen onto the front windshield 16.

In operation 520, the sensor system 12 indicates that the windshield wipers 18 should not be activated. The present application contemplates that the sensor system 12 may indicate that the rain wiper sequence should not be activated because the sensor system 12 has not determined that the one or more objects have fallen onto the front windshield 16.

Figure 8:
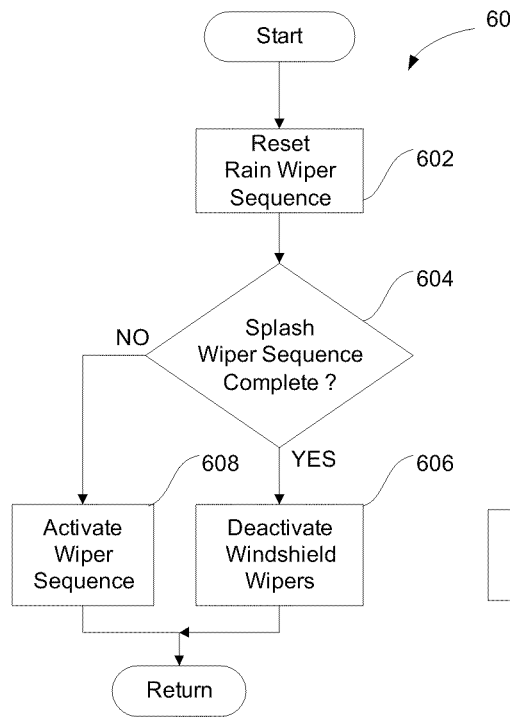
FIG. 8 is a flow diagram illustrating a windshield wiper activation sequence according to one non-limiting embodiment of the present application.

With reference back to the drawings, FIG. 8 is an exemplary flow diagram 600 according to one or more embodiments of the present application. However, it should be noted that the flow diagram 600 is merely exemplary, and the operation, function, or steps of the flow diagram 600 may be performed in a fashion other than the order described herein.

The flow diagram 600 illustrated in FIG. 8 may be representative of the operation of the splash wiper sequence as described above with reference to FIG. 3. Moreover, the splash mode wiper sequence illustrated in flow diagram 600 may be representative of when the sensor system 12 indicates that an object is approaching the front windshield 16 of the vehicle 10.

The present application contemplates that flow diagram 600 may be performed by the controller included within the sensor system 12. However, the present application further contemplates that a controller external to the sensor system 12 may also perform the operations described with reference to flow diagram 600. The external controller may perform the operations illustrated in flow diagram 600 when the sensor system 12 indicates an object may be approaching the front windshield 16.

Flow diagram 600 may begin at operation 602 where the controller may reset the rain wiper sequence. Once the controller resets the rain wiper sequence the flow diagram 600 proceeds to operation 604.

In operation 604, the controller may determine if the splash wiper sequence is complete. Moreover, operation 604 illustrates that the controller may determine whether a previously activated splash wiper sequence is complete. If the controller determines that the splash wiper sequence is complete, flow diagram 600 proceeds to operation 606. However, if the controller determines that the splash wiper sequence is not complete, the flow diagram 600 proceeds to operation 608.

In operation 606, the controller may deactivate operation of the windshield wipers 18. For example, the controller may deactivate operation of the windshield wipers 18 upon completion of the splash mode wiper sequence.

Figure 9:
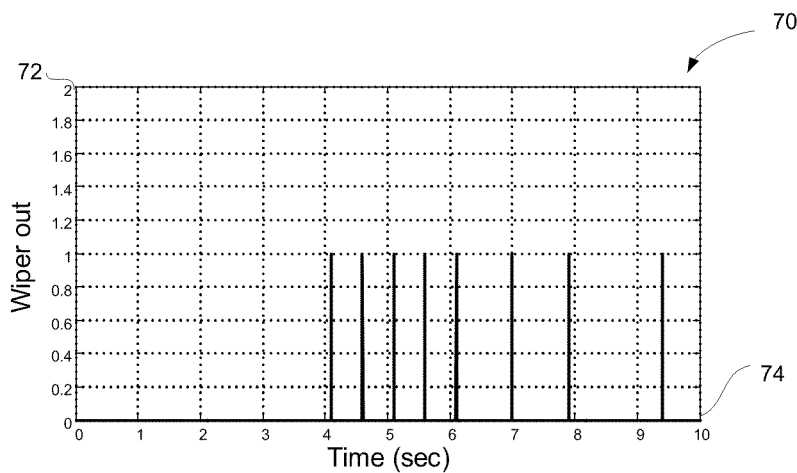
FIG. 9 is an exemplary graph illustrating the windshield wiper activation sequence according to a non-limiting embodiment of the present application.

In operation 608, the controller may activate the splash wiper sequence. For example, FIG. 9 is an exemplary graph 70 illustrating one non-limiting splash wiper sequence that may be activated by the controller. As illustrated, the graph 70 includes a vertical axis 72 that is representative of the controller output signal activating the windshield wipers 18. The graph 70 further includes a horizontal axis 74 that is representative of the time between the activation of the windshield wipers 18.

As is further illustrated, the controller may begin activation of the windshield wipers 18 at a predetermined time (e.g., 4 seconds). Furthermore, between a time of 4 and 6 seconds, the controller may operate the windshield wipers 18 at a high intensity level. The controller may operate the windshield wipers 18 at a high intensity level because the sensor system 12 may have indicated that an object is approaching the front windshield 16.

However, graph 70 further illustrates that after a time of approximately 6 seconds, the controller may be begin to reduce the intensity of the windshield wipers 18. The controller may begin to reduce the intensity of the windshield wipers 18 because the sensor system 18 is no longer indicating that an object is approaching the front windshield 16.

Figure 10:
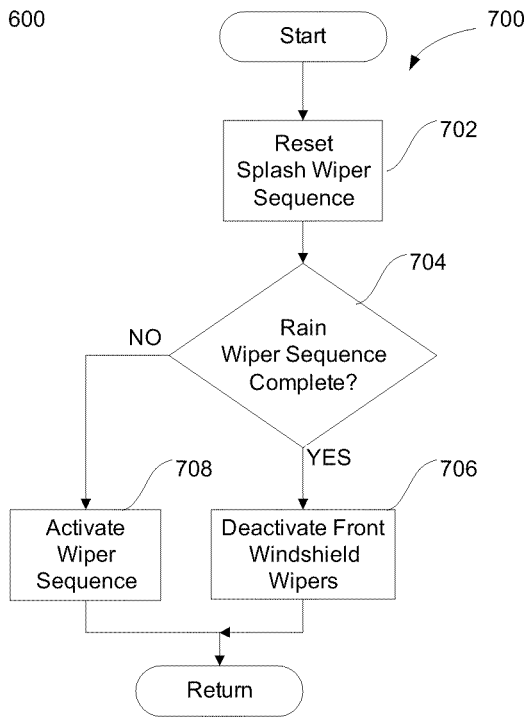
FIG. 10 is another exemplary flow diagram illustrating the windshield wiper activation sequence according to another non-limiting embodiment of the present application.

With reference back to the drawings, FIG. 10 is an exemplary flow diagram 700 according to one or more embodiments of the present application. However, it should be noted that the flow diagram 700 is merely exemplary, and the operation, function, or steps of the flow diagram 700 may be performed in a fashion other than the order described herein.

The flow diagram 700 illustrated may be representative of the operation of the rain wiper sequence. Moreover, the rain wiper sequence illustrated in flow diagram 700 may be representative of when the sensor system 12 indicates that an object has landed upon the front windshield 16 of the vehicle 10. The present application contemplates that flow diagram 700 may be performed by the controller included within the sensor system 12. However, the present application further contemplates that a controller external to the sensor system 12 may also perform the operations described with reference to flow diagram 700. The external controller may perform the operations illustrated in flow diagram 700 when the sensor system 12 indicates an object has landed upon the front windshield 16.

Flow diagram 700 may begin at operation 702 where the controller may reset the splash wiper sequence. Once the controller resets the splash sequence the flow diagram 700 proceeds to operation 704.

In operation 704, the controller may determine if the rain wiper sequence is complete. Moreover, operation 704 illustrates that the controller may determine whether a previously activated rain wiper sequence is complete. If the controller determines that the rain wiper sequence is complete, flow diagram 700 proceeds to operation 706. However, if the controller determines that the rain wiper sequence is not complete, the flow diagram 700 proceeds to operation 708.

In operation 706, the controller may deactivate operation of the windshield wipers 18. For example, the controller may deactivate operation of the windshield wipers 18 upon completion of the rain wiper sequence.

In operation 708, the controller may activate the rain wiper sequence. The rain wiper sequence may be activated when the sensor system 12 indicates an object has landed upon the front windshield 16.

While embodiments of this application may have been illustrated and described, it is not intended that those embodiments illustrate and describe the only embodiments of the application. Rather, the words used in the above application are words of description, rather than limitations and it should be understood that various changes may be made to the above description without departing with the spirit and scope of the application. Thus, specific details disclosed are merely representative basis for teaching one skilled in the art to practice the present application.

What is claimed:

1. A method for determining that a windshield wiper of a vehicle should be automatically activated for removing an aqueous material from a front windshield, the method comprising:
   receiving at least one distance signal indicative of a distance between the aqueous material and the front windshield of the vehicle;
   determining a relative velocity of the aqueous material using the at least one distance signal, the relative velocity being indicative of a velocity between the aqueous material and the front windshield of the vehicle; and
   automatically activating a front windshield wiper prior to the aqueous material contacting the windshield in response to the distance signal being within a distance activation range and the relative velocity being within a velocity activation range.

2. The method of claim 1, further comprising:
   automatically deactivating the front windshield wiper after a predetermined wiper sequence is complete.

3. The method of claim 1 further comprising:
   determining that a windshield wiper should be automatically activated in response to the relative velocity exceeding a maximum velocity threshold.

4. The method of claim 3 further comprising:
   automatically activating the front windshield wiper in response to the relative velocity exceeding the maximum velocity threshold; and
   automatically deactivating the front windshield wiper after a predetermined wiper sequence is complete.

5. The method of claim 3 further comprising:
   determining if the front windshield wiper is activated; and
   determining if the front windshield wiper is erroneously causing the relative velocity to exceed the maximum velocity threshold.

6. The method of claim 1, wherein the at least one distance signal is generated using a closing velocity sensor.

7. A method for determining that a windshield wiper of a vehicle should be automatically activated for removing an aqueous material from a front windshield, the method comprising:
   receiving at least one distance signal indicative of a distance between the aqueous material and the front windshield of the vehicle;

receiving at least one velocity signal indicative of a relative velocity between the aqueous material and the front windshield of the vehicle;

automatically activating a front windshield wiper prior to the aqueous material contacting the windshield in response to the velocity signal exceeding a maximum velocity threshold.

8. The method of claim 7 further comprising:

automatically deactivating the front windshield wiper after a predetermined wiper sequence is complete.

9. The method of claim 7 further comprising:

determining if the front windshield wiper is activated; and determining if the front windshield wiper is erroneously causing the velocity signal to exceed the maximum velocity threshold.

10. The method of claim 7 further comprising:

determining that a windshield wiper should be automatically activated in response to the distance signal being within a distance activation range and the velocity signal being within a velocity activation range.

11. The method of claim 10 further comprising:

automatically activating the front windshield wiper in response to the distance signal being within the distance activation range and the velocity signal being within a velocity activation range; and automatically deactivating the front windshield wiper after a predetermined wiper sequence is complete.

12. A system for determining that a windshield wiper of a vehicle should be automatically activated to remove an aqueous material from a front windshield, the system comprising:

at least one sensor configured to receive at least one distance signal indicative of a distance between the aqueous material and the front windshield of the vehicle; and a controller in electrical communication with the at least one sensor, the controller configured to:

determine a relative velocity of the aqueous material using the at least one distance signal, the relative velocity being indicative of a velocity between the aqueous material and the front windshield of the vehicle; and automatically activate a front windshield wiper prior to the aqueous material contacting the windshield in response to the distance signal being within a distance activation range and the relative velocity being within a velocity activation range.

13. The system of claim 12, wherein the controller is further configured to:

automatically deactivate the front windshield wiper after a predetermined wiper sequence is complete.

14. The system of claim 12, wherein the controller is further configured to:

determine that a windshield wiper should be automatically activated in response to the relative velocity exceeding a maximum velocity threshold.

15. The system of claim 14, wherein the controller is further configured to:

automatically activate the front windshield wiper in response to the relative velocity exceeding the maximum velocity threshold; and automatically deactivate the front windshield wiper after a predetermined wiper sequence is complete.

16. The system of claim 14, wherein the controller is further configured to:

determine if the front windshield wiper is activated; and determine if the front windshield wiper is erroneously causing the relative velocity to exceed the maximum velocity threshold.

17. The system of claim 12, wherein the at least one sensor is a closing velocity sensor, and the at least one closing velocity sensor being configured to generate a distance and relative velocity of the aqueous material.

* * * * *